(12) United States Patent
Bose et al.

(10) Patent No.: US 12,397,599 B2
(45) Date of Patent: Aug. 26, 2025

(54) SUPPLY LINE DISTANCE COMPENSATION SYSTEM FOR USE IN A VEHICLE

(71) Applicant: SAF-Holland, Inc., Muskegon, MI (US)

(72) Inventors: Arnesh Bose, Grand Rapids, MI (US); Justin Fisher, Kent City, MI (US); Eric Terpsma, Twin Lake, MI (US); Marc R. Johnson, Spring Lake, MI (US); Lance Gage, Hudsonville, MI (US)

(73) Assignee: SAF-Holland, Inc., Muskegon, MI (US)

( * ) Notice: Subject to any disclaimer, the term of this patent is extended or adjusted under 35 U.S.C. 154(b) by 348 days.

(21) Appl. No.: 18/189,531

(22) Filed: Mar. 24, 2023

(65) Prior Publication Data

US 2024/0286448 A1    Aug. 29, 2024

Related U.S. Application Data

(60) Provisional application No. 63/487,091, filed on Feb. 27, 2023.

(51) Int. Cl.
*B60D 1/64*    (2006.01)
(52) U.S. Cl.
CPC ..................... *B60D 1/64* (2013.01)

(58) Field of Classification Search
CPC ........... B60D 1/62; B25J 18/00; B65H 75/425
See application file for complete search history.

(56) References Cited

U.S. PATENT DOCUMENTS

| | | | | |
|---|---|---|---|---|
| 4,135,760 | A * | 1/1979 | Grossbach | E05D 15/1081 296/155 |
| 5,186,406 | A * | 2/1993 | Romanelli | G02B 6/4457 242/376 |
| 5,294,066 | A * | 3/1994 | Lacour | B66C 13/12 242/396.5 |
| 6,281,441 | B1 * | 8/2001 | Van Mill | B60R 16/0207 439/503 |
| 10,559,951 | B1 * | 2/2020 | Kestler | H02G 11/006 |
| 12,042,932 | B2 * | 7/2024 | Roulet-Dubonnet | F16G 13/20 |

* cited by examiner

*Primary Examiner* — Vanessa Girardi
(74) *Attorney, Agent, or Firm* — Price Heneveld LLP (57) ABSTRACT

A vehicle includes a compensation system for holding and guiding supply lines on the vehicle, the compensation system including a fixed part fixed relative to a frame of the vehicle and a movable part configured to adjust to different positions with respect to the frame, a supply line having a first line end connected to the fixed part and a second line end connected to the movable part, a first end section fixed to the fixed part or the movable part, and a second end fixed to the other of the fixed part and the movable part and configured to prevent sagging of the supply line when a distance between the fixed and movable parts is reduced.

20 Claims, 9 Drawing Sheets

SUPPLY LINE DISTANCE COMPENSATION SYSTEM FOR USE IN A VEHICLE

The present invention relates to a vehicle and compensation system as disclosed and described herein that is adapted and configured to minimize slack and in particular sagging of supply lines on a vehicle.

BACKGROUND

Vehicles known from the prior used to have different systems which are connected by supply lines, in particular electric cables or pipes or hoses for connecting climatic or hydraulic systems with each other. Such connections also connect subsystems which are movable relative to each other and can for instance be positioned and fastened in different positions. In cases, where the distance between two systems connected by a supply line is reduced the risk of slack in the supply line which may cause damage to the supply line when it contacts neighboring parts of the vehicle. An example of such movable parts of subsystems, which are connected by supply lines, is a slider suspension on a trailer, in particular the trailer of a heavy-duty vehicle. This slider suspension is usually connected with electric wires and/or pneumatic supply lines to a base part of the trailer, which unlike the slider suspension is not moveable or adjustable in different positions along the longitudinal direction of the trailer. Thus, when changing the distance of the slider suspension from the base of the trailer, the supply lines have to adapt to the new distance, which may cause tensions or sagging.

SUMMARY OF THE PRESENT INVENTION

At least one of the embodiments as shown and described herein provides a vehicle and a compensation system, which allows reducing the slack of supply lines installed at the vehicle in case the distance between the two attachment points of the supply line is reduced.

At least one of the embodiments as shown and described herein may include a vehicle that comprises a compensation system, in particular for holding and guiding supply lines on said vehicle, that may include a fixed part, which is immovable relative to a frame of the vehicle and a movable part which can be adjusted in different positions at the frame of said vehicle, a supply line, preferably an electric cable or a pneumatic line, said supply line has a first line end, which is connected to said fixed part and a second line end connected to said movable part, and wherein the compensation system comprises a first end section and a second end section, wherein at least one of the first and the second end section is fixed to either the fixed part or the movable part, wherein the compensation system is configured to prevent slack of the supply line when the distance between the fixed part and the movable part is reduced. The compensation system does in other words compensate the reduced distance between the two attachment points, in particular the first line end and the second line end of the supply line in such manner, that the supply line between those two attachment points does not sag.

According to a first embodiment a compensation system may include a first arm and a second arm, said arms being pivotably connected to each other at a joint section, wherein the first arm is pivotably attached to a first end section and can rotate relative to the first end section only about a first axis, wherein the second arm is pivotably attached to a second end section and can rotate relative to the second end section only about a second axis, wherein the joint section allows the arms to pivot only around a third axis, said third axis running parallel to the first axis and the second axis, wherein the arms comprise holding means adapted to receive and hold and/or guide a section of a supply line extending between the first end section and the second end section, wherein on reducing or increasing the distance between the first end section and the second end section the arms deflect, such that the section of the supply line is held substantially in a plane perpendicular to the first axis. The arms of the compensation system according to the first embodiment are preferably formed as hollow profiles, which are made of stiff material. In particular, the arms may be adapted to at least partially guide the supply line within the hollow profile, wherein there are holes in the profile to let the supply line enter and exit the hollow profiles. This allows to protect the supply line from debris.

Preferably said section of the supply line has a first line end which is held at the first end section and a second line end which is held at the second end section, wherein reducing or increasing the distance between the first end section and the second end section does not cause longitudinal tensioning between the first line end and the second line end. It is preferred, that the section of the supply line which is held and guided by the compensation system according to the first embodiment, is not tensioned by the arms or the attachment brackets at the arms during the increasing or reducing of the distance between the two end sections of the compensation system. This is achieved by attaching the line and the end sections of the compensation system and holding the supply line substantially within a plane by the stable system of the at least two arms, which are prevented from moving in a vertical direction.

Furthermore preferred, the holding means comprise as brackets, which are attached to one of the arms and/or are formed as bores in the arms, which receive and guide the supply line. The brackets can be preferably formed as U- or C-shaped elements, which are attached to the outer side of the respective arm.

Preferably, the compensation system comprises a second joint section and an intermediate arm, wherein the first arm and the intermediate arm are pivotably connected to each other at said first joint section and the intermediate arm and the second arm are pivotably connected to each other at the second joint section, wherein on reducing or increasing the distance between the first end section and the second end section the arms deflect in opposing rotational directions, such that the intermediate arm is rotated about its central section. In a preferred variation of the first embodiment with two arms, the compensation system may also have three or more arms, which are pivotably connected to each other by joints. The advantage of having more than two arms is that the deflection of the respective joint section connecting to arms can be reduced, in particular to not exceed the width of a vehicle frame. In the example of a compensation system with two arms and the compensation system being arranged centrally at the vehicle, the maximum deflection of the joint section between the two arms is half the width of the vehicle frame. This limits the difference of length the compensation system can compensate. Therefore, it is preferable to have at least one intermediate arm which is connected to the first and the second arm in two joint sections, which increases the difference of length the compensation system can compensate to almost twice the width of the vehicle frame.

In a preferred embodiment, the compensation system comprises a plurality of intermediate arms, wherein said first intermediate arm is pivotably connected to a second intermediate arm at an intermediate joint section, wherein the second intermediate arm is pivotably connected to a third intermediate arm at another intermediate joint section and wherein the third intermediate arm and the second arm are pivotably connected to each other at the second joint section, wherein on reducing or increasing the distance between the first end section and the second end section the arms deflect such that the intermediate arms are rotated about their central sections.

Furthermore preferred, said intermediate arms are attached to a guide device extending parallel to the first axis, wherein the intermediate arms comprise a guide point at their respective central section, wherein each of the intermediate arms is supported rotatably at the respective guide point and moveable parallel to the first direction. The guide device preferably comprises a C-shaped profile at which the intermediate arms are guided along the first axis at their guide points.

According to a second embodiment the compensation system, in particular for holding and guiding at least one supply line, may further or alternatively include a plurality of chain segments which are pivotably connected to each other at a plurality of joint sections, wherein a first of said chain segments is attached to a first end section and can rotate relative to the first end section only about a first axis, wherein a second of the chain segments is pivotably attached to a second end section and can rotate relative to the second end section only about a second axis, wherein the joint sections allow the chain segments to pivot only around one of a plurality of chain axes, said chain axes running substantially parallel to the first axis and the second axis, wherein the chain segments have a hollow cross section which forms holding means adapted to receive and hold and/or guide a section of a supply line extending between the first end section and the second end section, wherein on reducing or increasing the distance between the first end section and the second end section the chain segments deflect, such that the section of the supply line is held substantially in a plane perpendicular to the first axis. The embodiment of a plurality of chain elements is in other words the further development of a compensation system with multiple arms. While the complexity of the system is increased, it allows a more flexible positioning of the compensation system and the supported supply line.

According to a third embodiment the compensation system, in particular for holding and guiding at least one supply line may further or alternatively include a first wheel arrangement with at least one first wheel, which is rotatable about a first axis and a second wheel arrangement, with a second wheel, which is rotatable about a second axis, said wheel arrangements being held apart from each along a third axis other by a tensioning device, wherein the third axis stands orthogonal on the first axis and on the second axis, wherein each of an outer half of the first wheel and an outer half of the second wheel face away from the tensioning device wherein a section of said supply line has a first line end which is held at a fixed part of a vehicle and a second line end which is held at a movable part of said vehicle, wherein said section of the supply line is slung around both outer halves of the wheels and pre-tensioned by the tensioning device, wherein the wheels each have an outer rim, which is formed as holding means to receive the supply line. As an alternative to the previously described embodiments, based on arms or chain elements which are pivotably connected to each other, this embodiment utilizes pre-tensioned wheels, which roll up the supply line in case, the distance between the line ends is reduced. The advantage of this embodiment is that it is more lightweight solution compared to the before described embodiments.

Preferably, the at least one of the first wheel arrangement and the second wheel arrangement is guided by a wheel rail which extends parallel to the third axis and immovable relative to said fixed part. In particular to prevent the supply line from having to bear not only its own weight, but also the wide of the compensation system, that compensation system is attached at the frame of the vehicle, in particular, by a rail system which allows longitudinal movements of the compensation system relative to the vehicle.

Furthermore preferred, the first wheel arrangement comprises a plurality of first wheels, each of which is rotatable about said first axis and the second wheel arrangement comprises a plurality of second wheels, each of which is rotatable about said second axis, wherein the supply line is multiple times slung around the outer halves of said first and second wheels. To increase the total length of supply line, the compensation system is able to roll up, it may be preferred to have several wheels which are arranged parallel to each other. The main principle remains the same, and the supply line is slung around the outer halves of the respective wheels. The advantage of this embodiment is that wheels of smaller diameter can be used in the compensation system while the lengths of the supply line which can be rolled up remain the same.

In particular preferred, the tensioning device comprises at least one of a spring and an actuator, preferably a pneumatic actuator. The advantage of a spring, in particular preferred a coil spring is, that it is simple in its basic construction and cheap. In case a more precise pre-tensioning of the supply line is needed, and actuator, in particular preferred and pneumatic actuator, can be advantageous, because the spring force provided by this actuator can be adjusted.

According to a fourth embodiment the compensation system, in particular for holding and guiding at least one supply line, may further or alternatively include a first wheel arrangement with a first wheel, which is rotatable about a first axis and a second wheel arrangement, with a second wheel, which is rotatable about a second axis, wherein the first wheel arrangement comprises a first end section which is attached to a fixed part of a vehicle and holds the first wheel, wherein the second wheel arrangement comprises a second end section, which is attached to a movable part of said vehicle and holds the second wheel, wherein each of said wheel arrangements comprises a tensioning device which rotationally pre-tension said wheels in the same rotational direction or in opposing rotational directions around the first and the second axis, wherein a section of said supply line has a first line end which is held at said first end section and a second line end which is held at said second end section, wherein said section of the supply line is slung around at least a section of each of the first wheel and the second wheel and is pre-tensioned by the tensioning devices. Comparable to the third embodiment, the fourth embodiment utilizes wheels, which however are not held on a certain distance from each other by a tensioning device, but which are mounted to the fixed and to the movable part of the vehicle. The supply line is at its ends fixed to each of the wheels and is reeled, when the distance between the fixed part and the movable part is reduced.

Preferably the wheels are designed as reels and said tensioning devices are formed as torsion springs. The tensioning devices in this embodiment pre-tension the wheels in a certain rotational direction, such that the supply line is automatically reeled by the wheels and tensioned, such that slack of the supply line is minimized.

Furthermore preferred, the first wheel is mounted at said first end section at a first wheel hub and the second wheel is mounted at said second end section at a second wheel hub, wherein preferably at least one of the wheel hubs comprises an internal rotary contact for current transmission from a part of the supply line mounted at the respective end section to a part of the supply line mounted to the respective wheel. In particular to avoid twisting of the supply line, it is preferred to have a sliding contact within the wheel hub of each of the wheels.

According to a fifth embodiment the compensation system, in particular for transmitting electric current between a fixed part of a vehicle and a movable part, may further or alternatively include a track assembly which is fixedly mounted to said fixed part, wherein the track assembly comprises a body with at least two track recesses which extend with constant cross section along a first axis, wherein a track conductor is mounted in each recess and is connected to a section of a supply line, which is mounted at the fixed part; and a slider which is mounted to said movable part and comprises at least two slider contacts, wherein each of said slider contacts engages at one of said track recesses and contacts one of said track conductors, wherein said slider is mounted at said body such that only movements relative to the body along the first axis are possible, wherein said slider contacts are connected to a section of a supply line, which is mounted at the movable part. As an alternative to the embodiments of the compensation system described before, the compensation system may also be based on sliding contacts to compensate the length change at vehicle. The advantage of this system is, that there is no need to pre-tension a supply line or to provide rather heavy and swinging arms. However, the sliding contacts may only be used to transmit electrical current of low voltages.

Preferably, at least one of said track recesses is covered by a flexible shield. The flexible shield covers the recess and avoids dirt and debris from entering the recesses and reducing the functionality of the compensation system.

According to a sixth embodiment the compensation system, in particular for transmitting electric current between a fixed part of a vehicle and a movable part, may further or alternatively include an outer pipe which is fixedly mounted to a first of a fixed part or a movable part of a vehicle; and an inner pipe, which is fixedly mounted to the other of said fixed part and movable part, wherein the outer pipe comprises a hollow body with at least two outer conductors mounted at the inner wall of said body which are connected to a first section of a supply line, wherein said hollow body and said outer conductors extend with substantially constant cross section along a first axis wherein said inner pipe is inserted in the outer pipe and is movable relative to said outer pipe along said first axis, wherein the inner pipe which comprises at least two inner contacts mounted at the outer side of said inner pipe, wherein each of said inner contacts applies electrical contact at one of said outer conductors. As an alternative to the before described embodiment based on a track system, the compensation system may also comprise an outer pipe, which internally receives and guides and inner pipe, wherein electrical current can be transmitted by a sliding contact between the inner pipe and the outer pipe. The advantage of this solution, compared to the solution with the track assembly, is that the pipe system is hermetically sealed against the environment and therefore protected better from dirt and debris.

A compensation system of another preferred embodiment may further or alternatively include a support device which is fixedly mounted to a first of a fixed part or a movable part of a vehicle, wherein the support device comprises a support bar extending with constant cross section parallel to a first axis, wherein a supply line has a first line end which is held at a first end section of said support device and comprises a helical section which winds around the support bar, wherein the support line comprises a second line end which remains moveable relative to the support bar, wherein the distance between the windings of the helical section increases, when the second line end is moved away from the first line end. In other words, the compensation system of this preferred embodiment is designed as festoon, with the support line being wound around a support bar. The support bar is preferably formed as cylindrical rod, which carries the helically extending helical section of the support line.

It is to be understood, that combinations of the before described embodiments can be used at vehicle, in particular to face different requirements at different mounting positions at the vehicle when compensating length differences at a supply line.

BRIEF DESCRIPTION OF DRAWINGS

Preferred embodiments are described in the following with regard to the enclosed figures.

DETAILED DESCRIPTION OF PREFERRED EMBODIMENTS

For purposes of description herein, the terms "upper," "lower," "right," "left," "rear," "front," "vertical," "horizontal," and derivatives thereof shall relate to the invention as oriented in FIGS. 1, 4, 7, 8, 10, 12, 15, 18A and 18B. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 1:
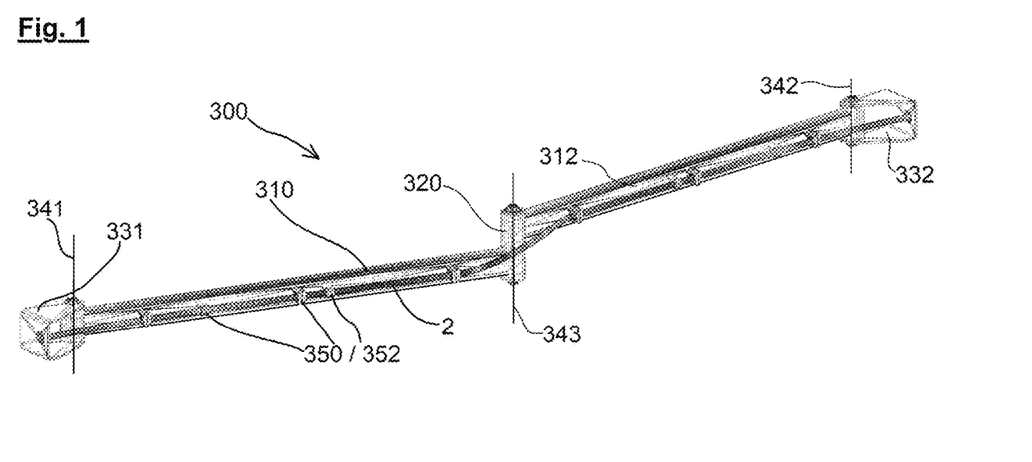
FIG. 1 is a perspective view of a first embodiment of a compensation system.
Figure 2:
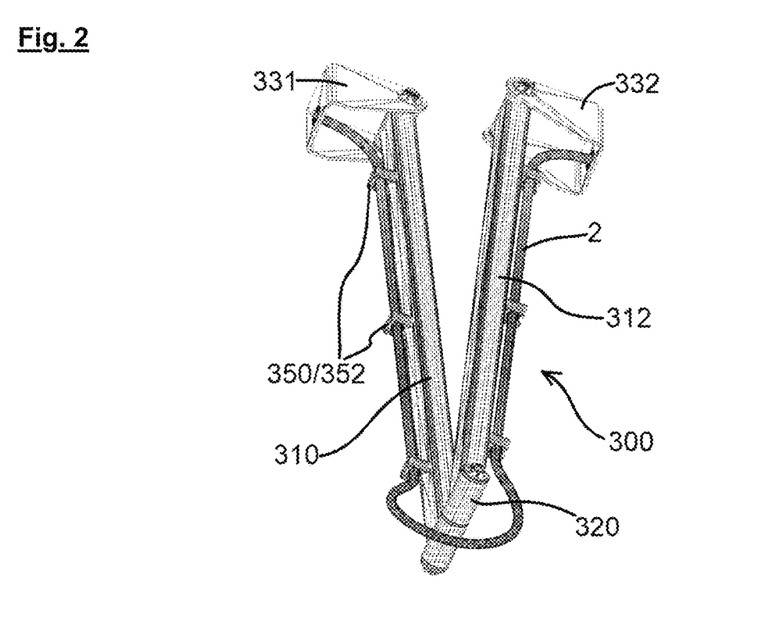
FIG. 2 is a perspective view of the compensation system of FIG. 1, in a contracted state.
Figure 18A:
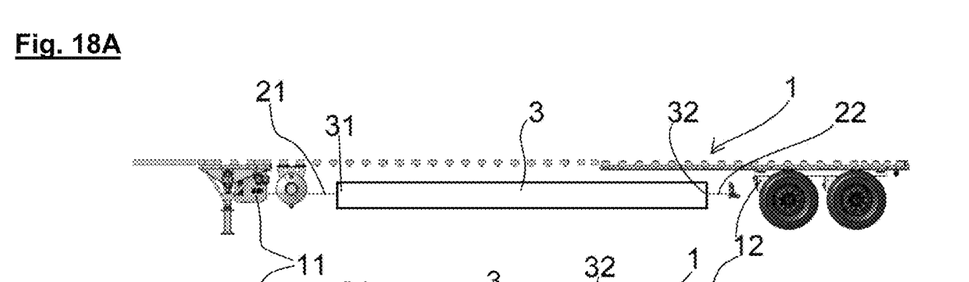
FIG. 18A is a side elevation view of a vehicle including the compensation system.

FIG. 1 shows a first embodiment of the compensation system 300 according to the present invention in its extended state. FIG. 2 shows the same embodiment of a compensation system 300 in the contracted state, e.g., the state when the movable part 12 of a vehicle 1 has its minimum distance from the fixed part 11 (FIG. 18A). The compensation system 300 comprises a first arm 310 and a second arm 312 which are connected to each other by a joint section 320 and which may swing relative to each other around a third axis 343. The first arm 310 is pivot-ally attached at a first end section 331 and may swing around a first axis 341. The first end section 331 is preferably attached to the fixed part 11 of the vehicle 1. The second arm 312 is pivotably attached to a second end section 332, which is connected to the movable part 12 of vehicle 1. The second arm 312 and the second end section 332 may swing relative to each other around a second axis 342. It is preferred that the first axis 341, the second axis 342 and the third axis 343 are arranged substantially parallel to each other. To hold and prevent the supply line 2 from sagging, there are holders 350 arranged at the arms 310 and 312. In the particular embodiment shown in FIGS. 1 and 2 these holders 350 are formed as brackets 352.

Figure 3:
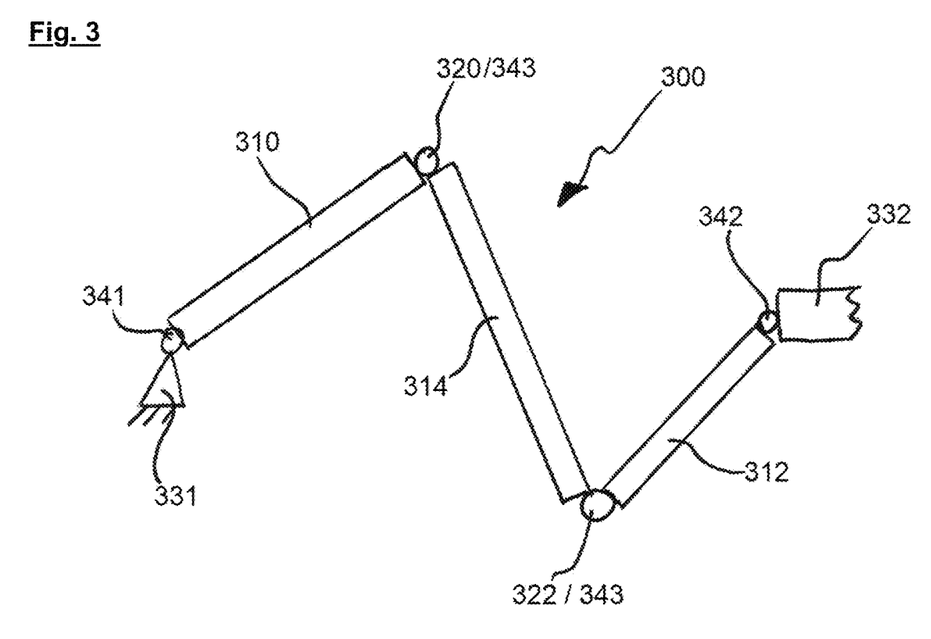
FIG. 3 is a schematic top plan view of a variation of the first embodiment of a compensation system with an additional intermediate arm.

FIG. 3 shows a variation of the compensation system 300 of FIGS. 1 and 2. In particular preferred, the compensation system 300 may furthermore comprise an intermediate arm 314 which is coupled to the first arm 310 and the second arm 312 via a first joint section 320 and a second joint section 322. The basic principle of this variation of compensation system 300 remains the same as described for the embodiment of FIGS. 1 and 2.

Figure 4:
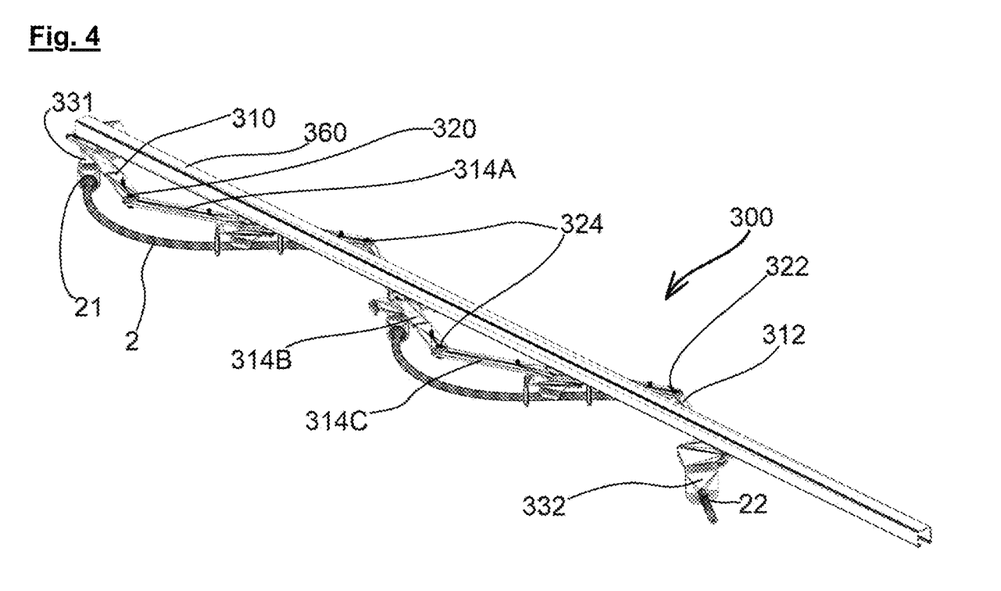
FIG. 4 is a perspective view of another variation of the first embodiment of a compensation system with a plurality of additional intermediate arms in an extended state.
Figure 5:
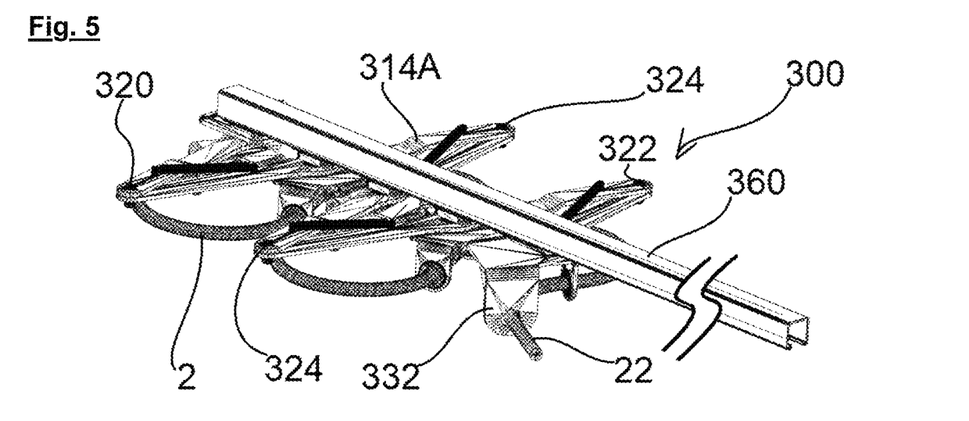
FIG. 5 is a perspective view of the compensation system of FIG. 4 with the intermediate arms in a contracted state.
Figure 6:
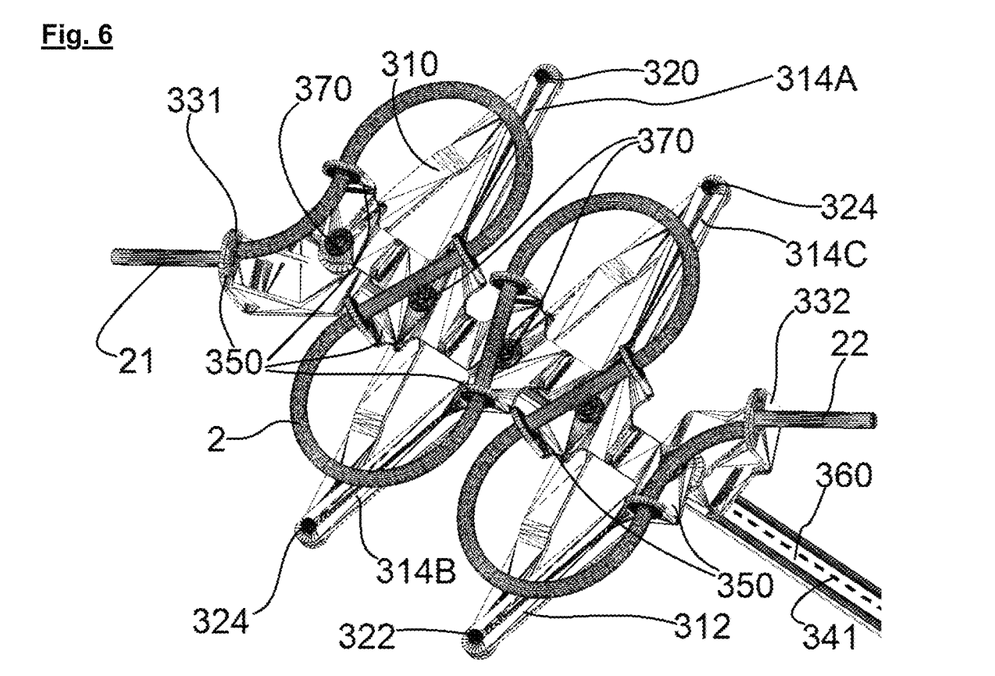
FIG. 6 is a perspective view of the compensation system of FIG. 4.

In the embodiment of FIGS. 4-6 the compensation system 300 comprises multiple intermediate arms 314A, 314B and 314C, which are rotatably connected to each other in intermediate joint sections 324. Preferably, the compensation system 300 comprises a guide device 360 with a slot serving as rail for holding and guiding the intermediate arms at their guide points 370 to move only along the first axis 341. The guide device 360 is preferably attached to the fixed part of the vehicle, in particular at the frame of the vehicle. Furthermore, the first arm 310, the intermediate arms 314A, 314B, 314C and the second arm 312 comprise the holders 350, which are preferably formed as brackets and hold the support line 2 substantially in a horizontal plane, when the distance between the first line end 21 and the second line end 22 is decreased. FIG. 4 shows the extended state of the compensation system 300 and FIGS. 5 and 6 show the contracted state.

Figure 7:
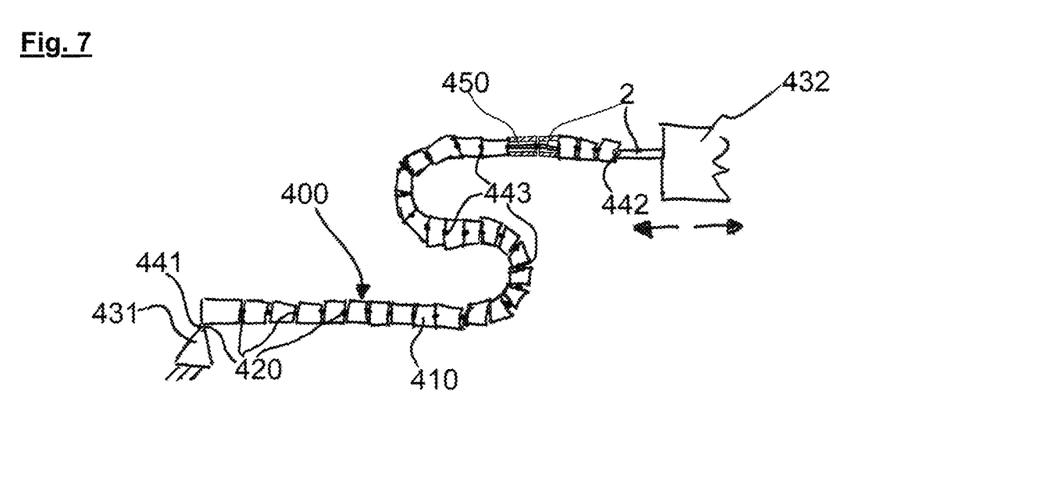
FIG. 7 is a schematic side elevation view of a second embodiment of a compensation system.

FIG. 7 shows another embodiment of a compensation system 400, comprising a plurality of chain segments 410. These chain segments 410 are provided with a hollow shape, wherein the hollow opening within each of the chain segments 410 serves as a holder 450 for holding and guiding the supply line 2. The chain segments 410 are pivotably connected to each other via joint sections 420, which allow pivoting around a parallel axis of the third axis 443. Furthermore, the first chain segment 410 on the left is pivotally connected to the first end section 431 and rotatable about a first axis 441. The last chain segment 410 on the right-hand side is connected to the second end section 432 and pivotable around a second axis 442. It is preferred that the axes 441, 442 and 443 are substantially parallel to each other. In this preferred embodiment, the first end section 431 is connected to the fixed part 11 of the vehicle 1 and the second end section 432 is connected to the movable part 12 of vehicle 1.

Figure 8:
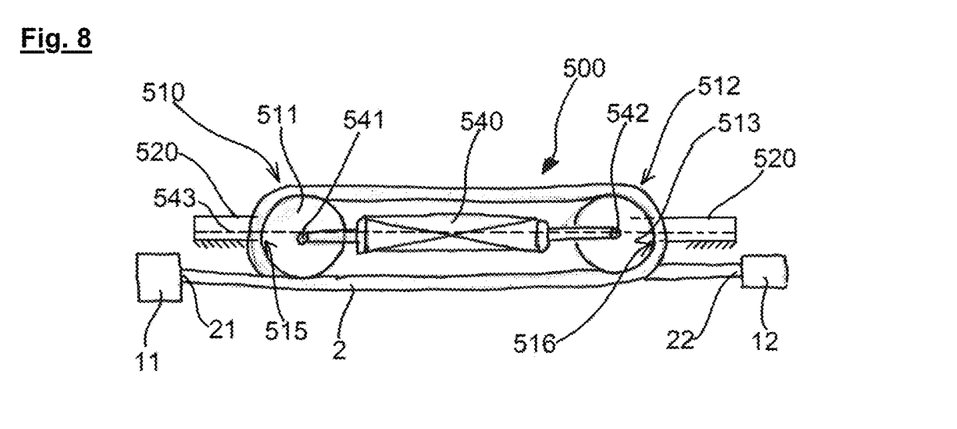
FIG. 8 is a schematic side elevation view of a third embodiment of a compensation system in a contracted state.
Figure 9:
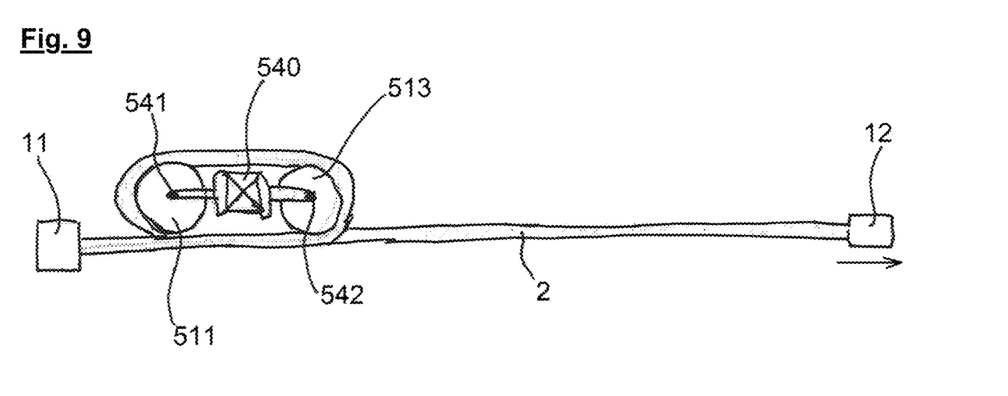
FIG. 9 is a schematic side elevation view of the compensation system of FIG. 8.

FIGS. 8 and 9 show another embodiment of a compensation system 500, wherein FIG. 8 shows the state of reduced distance between the fixed part 11 and the movable part 12 of the vehicle 1 and FIG. 9 shows the state of maximum distance between the fixed part 11 and the movable part 12. The compensation system comprises two wheel arrangements 510, 512 of which the first wheel arrangement 510 comprises a first wheel 511 which is rotatable about a first axis 541 and of which the second wheel arrangement 512 comprises a second wheel 513 which is rotatable about a second axis 542. Preferably at the rotation axes 541, 542 a tensioning device 540 engages the two wheels 511, 513 and pushes them away from each other. Accordingly, the tensioning device 540 tensions the supply line 2 which is slung around the outer halves 515, 516 of the wheels 511, 513. When the movable part 12 is moved away from the fixed part 11, the supply line 2 is pulled off the compensation system 500 such that the wheels 511, 513 are moved towards each other against the force provided by the tensioning device 540. This results in the position shown in FIG. 9, where the wheels 511 and 513 are at their closest position relative to each other and the tensioning device 540 has its smallest extension parallel to the third axis 543. It is advantageous, that in the state shown in FIG. 9, where the supply line 2 on the right-hand side has the maximum, freely hanging length, that the tensioning device 540 provides the maximum tensioning force, which tensions the supply line 2 via the compensation system 500 and minimizes sagging. It is preferred to mount the wheels 511, 513 at a wheel rail 520, which is fixed to the frame of the vehicle, in particular preferred relative to the fixed part 11 of the vehicle. The wheel rail 520 bears the weight of the compensation system 500 and helps to hold the supply line 2 in a horizontal plane.

Figure 10:
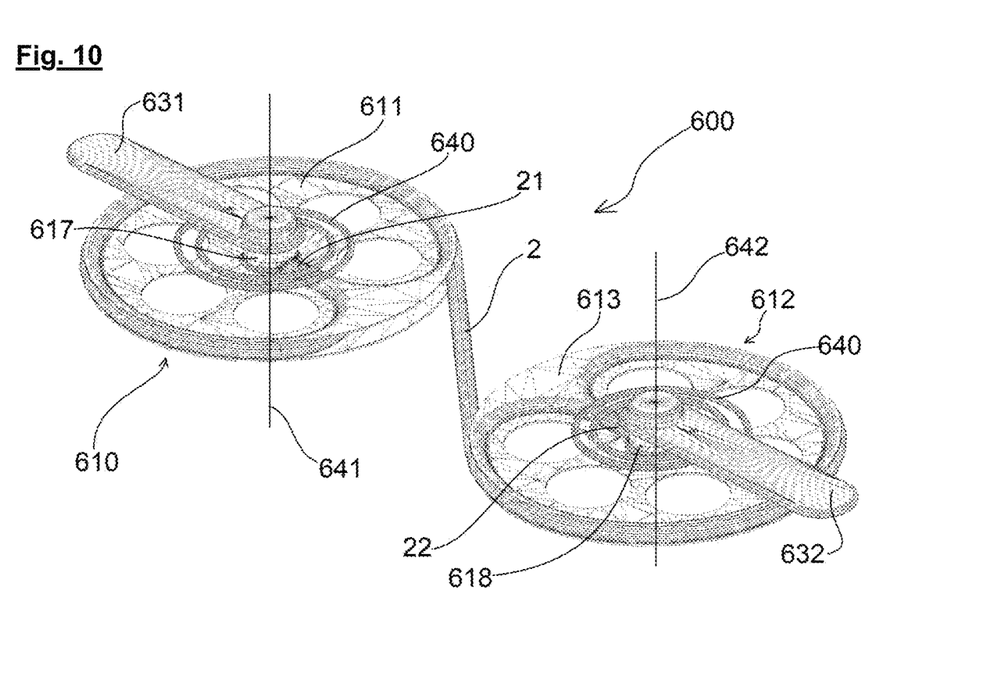
FIG. 10 is a perspective view of a fourth embodiment of a compensation system.

FIG. 10 shows another preferred embodiment of a compensation system 600 which also utilizes first wheel arrangement 610 and a second wheel arrangement 612. The first wheel arrangement 610 comprises a first wheel 611 which is mounted rotatably around a first axis 641 at a first end section 631. The first end section 631 is itself attached to either the fixed part 11 or the movable part 12 of a vehicle 1. The second wheel arrangement 612 comprises a second wheel 613 which is mounted rotatably around a second axis 642 at a second end section 632. The second end section 632 is attached to the other of the fixed part 11 or the movable part 12. Both wheel arrangements 610, 612 comprise a tensioning device 640, which is preferably a torsion spring that forces each of the wheels 611, 613 to rotate in a certain direction. The outer rim of each wheel 611, 613 is formed with the recess which guides and holds the supply line which is slung around a portion of said wheels 611, 613. When the end sections 631, 632 are moved away from each other, the supply line 2 is pulled off the wheels 611, 613 and rotates the wheels 611, 613 against the tensioning force of the tensioning devices 640. Accordingly, the free hanging section of the supply line 2 between the two wheels 611, 613 is pulled by the wheels 611, 613 and prevented from sagging. In particular preferred, both of the wheels 611, 613 comprise a wheel hub 617, 618 within which preferably a sliding electric contact is provided, which allows to transfer the electric current from the static, non-rotating section of the wheel arrangement 610, 612 to the rotating section, e.g. to the wheels 611, 613 with the supply line 2 attached to each of the wheels 611, 613.

Figure 11:
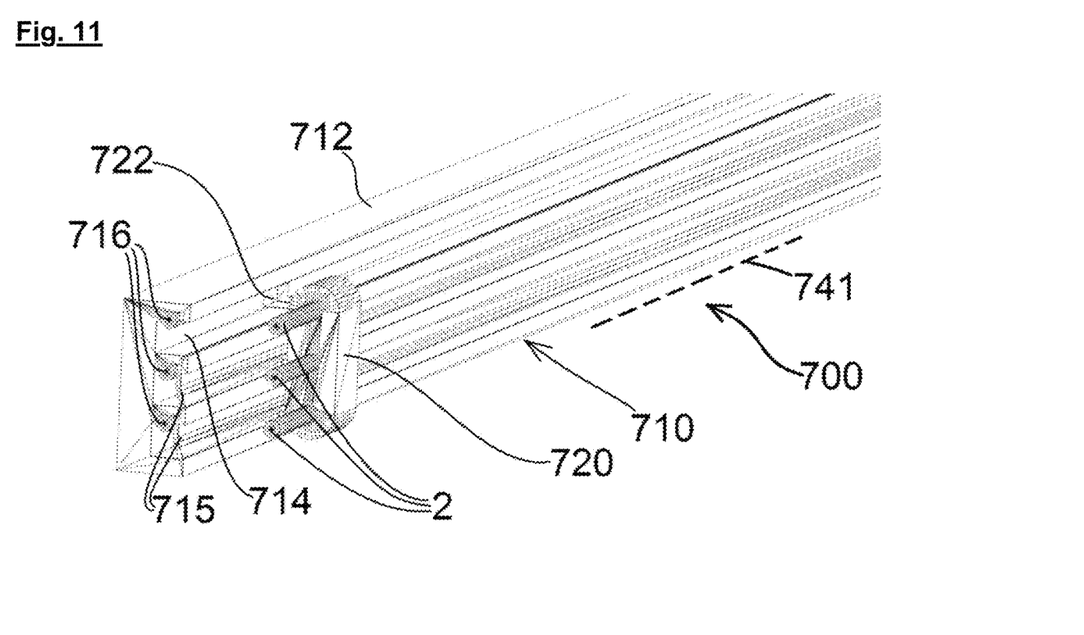

FIG. 11 shows another preferred embodiment of compensation system 700 with a track assembly 710 which comprises a body 712. The body 712 of the track assembly 710 comprises at least two track recesses 714, wherein in the example shown, there are preferably three of these recesses 714 provided at the body 712. Movable along a longitudinal direction relative to the body 712 there is arranged a slider 720 which has at least two slider contacts 722 (only one of which is visible), and in the preferred embodiment of FIG. 11 three slider contacts 722, which engage in the recesses 714. The slider contacts 722 each contact a track conductor 716 which is positioned in the respective recess 714 of the body 712. The sliding movement of the slider 720 relative to the body 712 allows for compensation of movements of a fixed part 11 relative to movable part 12 of the other vehicle, and allows for the transfer of electric current from one of these parts to the other. It is to be understood that there may be more than three recesses 714 with respective track conductors 716 provided in one body 712, increasing the number of different electrical signals, which may be transmitted by the compensation system 700. Furthermore preferred, the compensation system 700 comprises flexible shields 715 which cover the recesses 714 to protect the conductors 716 and the inner side of the recesses 714 from dust and fluids. In FIG. 11 only two of the three shields 715 are shown.

Figure 12:
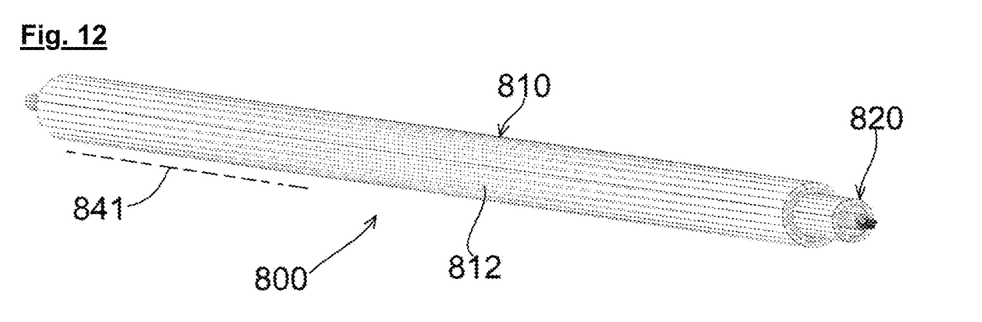
FIG. 12 is a perspective view of a sixth embodiment of a compensation system.
Figure 13:
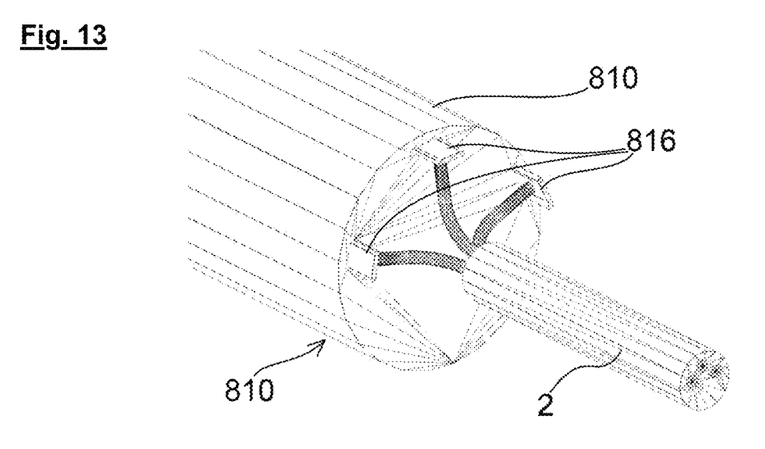
FIG. 13 is a perspective view of the compensation system of FIG. 12.
Figure 14:
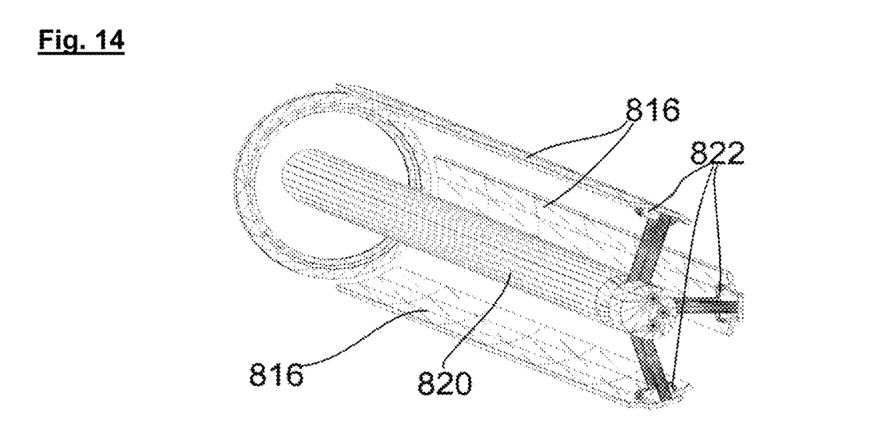
FIG. 14 is a cut-away perspective view of the compensation system of FIG. 12.

FIGS. 12 to 14 show another preferred embodiment of the compensation system 800. Instead of a track assembly 710 according to the embodiment of FIG. 11, the compensation system 800 comprises an outer pipe 810 which receives an inner pipe 820 and allows movements of the outer pipe 810 relative to the inner pipe 820 along a first axis 841. The outer pipe 810 comprises a hollow body 812 with at least two outer conductors 816 which are mounted at the inner wall of said hollow body 812. The inner pipe 820 comprises at least two inner contacts 822 which touch the outer conductors 816 at the outer pipe 810. As visible from FIG. 14 there are in the present example three slider contacts 822 that contact three outer conductors 816. The length which can be compensated by the compensation system 800 is almost the length of the outer pipe 810 (minus the length of the inner pipe 820 which remains within the outer pipe 810). It is preferred that there are not only three sliding contacts between the outer pipe 810 and the inner pipe 820, but a plurality of contacts, for instance 5 or 8 contact contacts, distributed over the inner circumference of the outer pipe 810.

Figure 15:
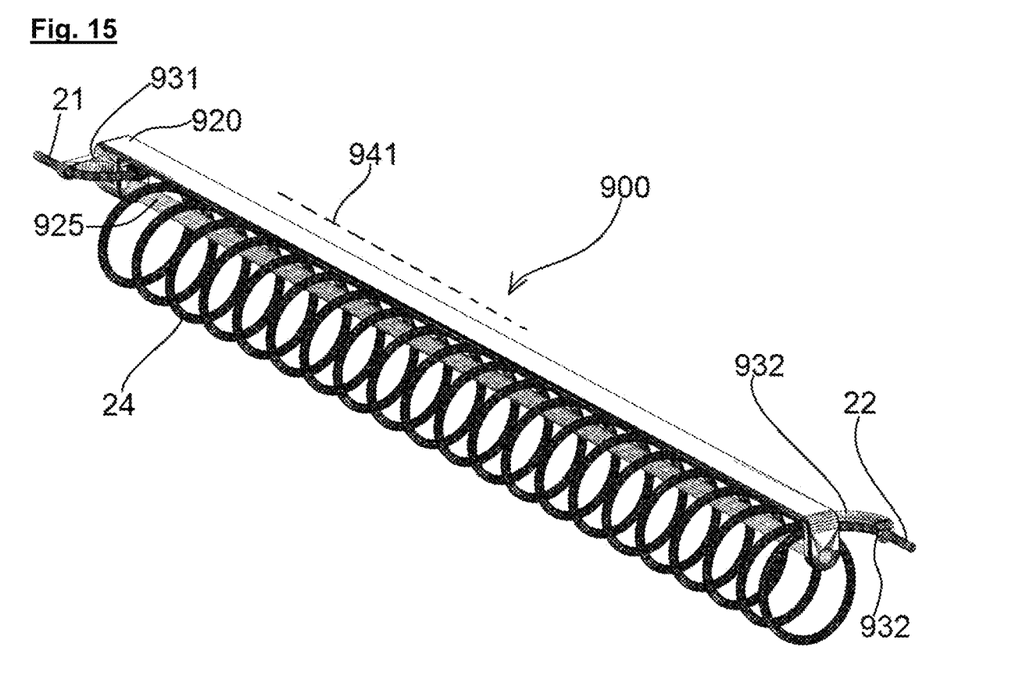
FIG. 15 is a perspective view of a seventh embodiment of a compensation system in an extended state.
Figure 16:
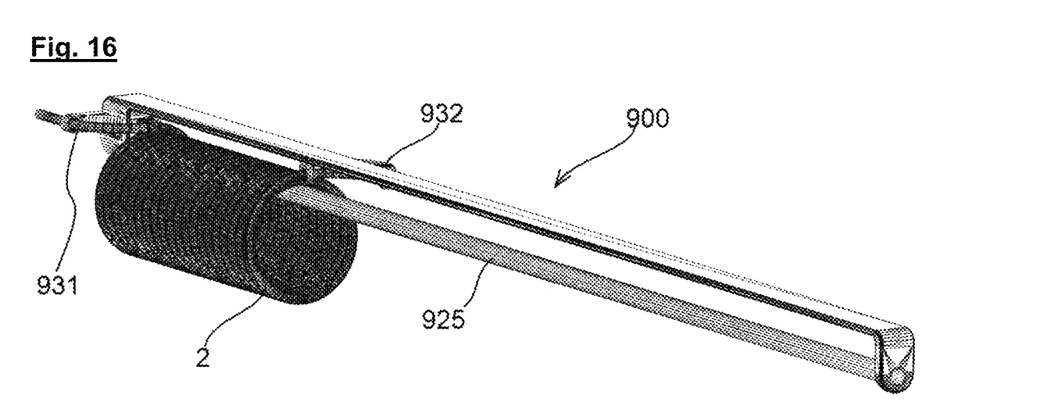
FIG. 16 is a perspective view of the compensation system of FIG. 15 in a contracted state.

FIGS. 15 and 16 show another preferred embodiment of the compensation system 900. The compensation system 900 comprises a support device 920 which is attached to either the fixed part 11 or the moveable part 12 of a vehicle 1. The support device 920 comprises a support bar 925 which extends with substantially constant cross section parallel to the first axis 941 and supports the windings of a helical section 24 of the support line 2. The helical section 24 comprises a plurality of windings, which allow the support line 2 to elastically extend its length along the first axis 941. To prevent sagging of the support line 2, the support bar 925 holds the helical section 24, while the windings of the helical section 24 can slide on the support bar 925. The second line end 22 of the support line 2 is held by a second end section 932 which is formed as bracket and orients the second line end 22 in a direction parallel to the first axis 941. Preferably, the second end section 932 could be guided by the guiding device 920, preferably the guide bar 925.

Figure 17A:
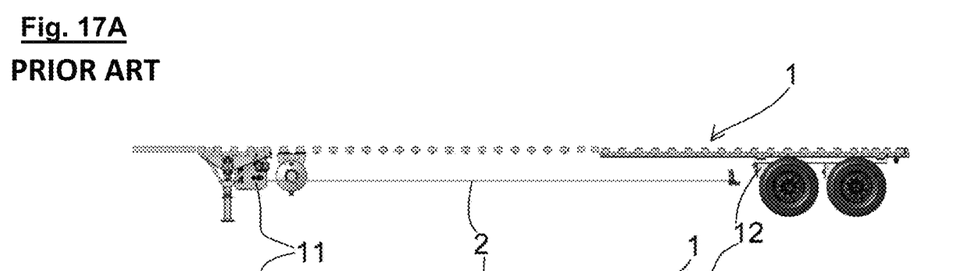
FIG. 17A is a side elevation view of a prior art vehicle.
Figure 17B:
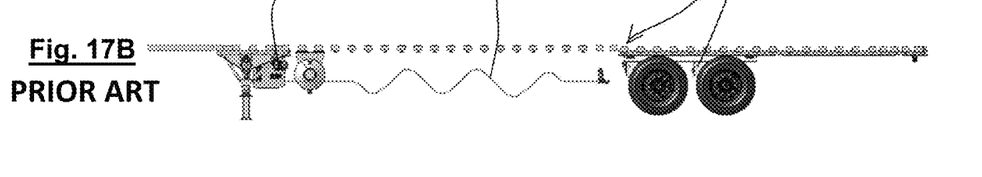
FIG. 17B is a side elevation view of the prior art vehicle.

FIGS. 17A, 17B show a vehicle 1, in this example as schematic view on a trailer of a utility vehicle, which is known from the prior art. This vehicle has movable section 12 which is movable along a longitudinal axis relative to a fixed section 11. A supply line 2 connects the fixed part 11 with the movable part 12 (FIG. 17B), moving over movable part 12 closer to the fixed part 11 results in sagging of the supply line 2.

Figure 18B:
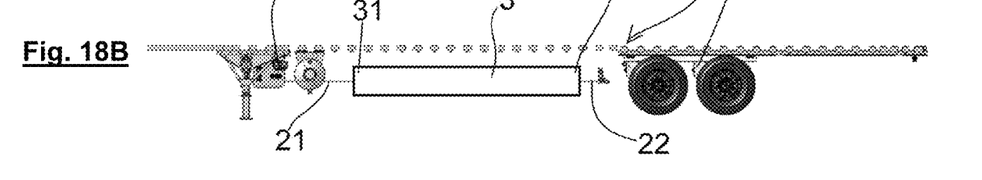
FIG. 18B is a side elevation view of the vehicle of FIG. 18A.

Accordingly, FIGS. 18A, 18B show the same example of a vehicle 1 as already shown in FIGS. 17A, 17B but with a compensation system 3 to avoid this sagging of the supply line 2 as known from the prior art (FIGS. 17A, 17B). The compensation system has a first end section 31 and a second end section 32 which can reduce their distance from each other and hold and guide the supply line 2. As described in the above examples of embodiments of compensation systems 300, 400, 500, 600, 700, 800, there are different technical ways to achieve this avoidance of sagging of a supply line 2.

The above description is considered that of the preferred embodiments only. Modifications of the embodiments disclosed herein will occur to those skilled in the art and to those who make or use the disclosed embodiments. Therefore, it is understood that the embodiments shown in the drawings and described above are merely for illustrative purposes and not intended to limit the scope of the invention, which is defined by the following claims as interpreted according to the principles of patent law, including the doctrine of equivalents.

It will be understood that any described processes or steps within described processes may be combined with other disclosed processes or steps to form structures within the scope of the present disclosure.

In the foregoing description, it will be readily appreciated by those skilled in the art that modifications may be made to the described embodiments, processes, or steps without departing from the concepts disclosed herein. Such modifications are to be considered as included in the following claims unless these claims by their language expressly state otherwise.

REFERENCE NUMERALS

1—vehicle
11—fixed part
12—movable part
2—supply line
21—first line end
22—second line end
24—helical section
3, 300, 400, 500, 600, 700, 800—compensation system
31, 331, 431, 531, 631, 931—first end section
32, 332, 432, 532, 632, 932—second end section
310—first arm
410—chain segment
312—second arm
314A, 314B, 314C—intermediate arm
320, 420—joint section
322—second joint section
324—intermediate joint section
341, 441, 541, 641, 741, 841, 941—first axis
342, 442, 542, 642—second axis 343—third axis
350, 450, 550—holder
352—bracket
360—guide device
370—guide point
443—chain axes
510, 610—first wheel arrangement
511, 611—first wheel
512, 612—second wheel arrangement
513, 613—second wheel
515—outer half of the first wheel
516—outer half of the second wheel
520—wheel rail
540, 640—tensioning device
617—first wheel hub
618—second wheel hub
710—track assembly
712, 812—body
714—track recess
716—track conductor
720—slider
722—slider contact
810—outer pipe
816—outer conductors
820—inner pipe
822—inner contact
920—support device
925—support bar

The invention claimed is:

1. A compensation system for holding and guiding at least one supply line, comprising:
    a first arm; and
    a second arm pivotably connected to the first arm at a joint section;
    wherein the first arm is pivotably attached to a first end section and is configured to rotate relative to the first end section about a first axis only;
    wherein the second arm is pivotably attached to a second end section and is configured to rotate relative to the second end section about a second axis only;
    wherein the joint section is configured to allow the first arm and the second arm to pivot around a third axis only, the third axis running substantially parallel to the first axis and the second axis;
    wherein the first arm and the second arm each include a holder configured to hold and/or guide a section of the at least one supply line extending between the first end section and the second end section; wherein
    wherein on reducing or increasing the distance between the first end section and the second end section the first and second arms deflect, such that the section of the at least one supply line is held substantially in a plane perpendicular to the first axis.

2. The compensation system according to claim 1, wherein the holder includes one or more brackets which are attached to at least one of the arms, and which receive and guide the at least one supply line.

3. The compensation system according to claim 1, wherein the holder includes a bore in each of the arms that receives and guides the at least one supply line.

4. The compensation system according to claim 1, further comprising:
    a second joint section and a first intermediate arm, wherein the first arm and the intermediate arm are pivotably connected to each other at the first joint section and the first intermediate arm and the second arm are pivotably connected to each other at the second joint section, and wherein on reducing or increasing the distance between the first end section and the second end section the first and second arms deflect in opposing rotational directions, such that the first intermediate arm is rotated about a central section of the first intermediate arm.

5. The compensation system according to claim 4, further comprising:
    a second intermediate arm, wherein the first intermediate arm is pivotably connected to a second intermediate arm at a first intermediate joint section; and
    a third intermediate arm, wherein the second intermediate arm is pivotably connected to a third intermediate arm at a second intermediate joint section, and wherein the third intermediate arm and the second arm are pivotably connected to each other at the second joint section; and
    wherein on reducing or increasing the distance between the first end section and the second end section the first and second arms deflect such that the second intermediate arm is rotated about a central section of the second intermediate arm, and the third intermediate arm is rotated about a central section of the third intermediate arm.

6. The compensation system according to claim 5, wherein each of the intermediate arms are attached to a guide device extending parallel to the first axis, wherein each of the intermediate arms include a guide point at the respective central section of each of the intermediate arms, and wherein each of the intermediate arms is supported rotatable at the respective guide point and moveable parallel to the first direction.

7. The compensation system according to claim 1, wherein the section of the at least one supply line has a first line end which is held at the first end section and a second line end which is held at the second end section, and wherein reducing or increasing the distance between the first end section and the second end section does not cause longitudinal tensioning between the first line end and the second line end.

8. The compensation system according to claim 7, wherein the holder includes a bore in each of the arms that receives and guides the at least one supply line.

9. The compensation system according to claim 7, wherein the holder includes one or more brackets which are attached to at least one of the arms, and which receive and guide the at least one supply line.

10. The compensation system according to claim 9, further comprising:
    a second joint section and a first intermediate arm, wherein the first arm and the intermediate arm are pivotably connected to each other at the first joint section and the first intermediate arm and the second arm are pivotably connected to each other at the second joint section, and wherein on reducing or increasing the distance between the first end section and the second end section the first and second arms deflect in opposing rotational directions, such that the first intermediate arm is rotated about a central section of the first intermediate arm.

11. The compensation system according to claim 10, further comprising:
    a second intermediate arm, wherein the first intermediate arm is pivotably connected to a second intermediate arm at a first intermediate joint section; and
    a third intermediate arm, wherein the second intermediate arm is pivotably connected to a third intermediate arm at a second intermediate joint section, and wherein the third intermediate arm and the second arm are pivotably connected to each other at the second joint section; and wherein on reducing or increasing the distance between the first end section and the second end section the first and second arms deflect such that the second intermediate arm is rotated about a central section of the second intermediate arm, and the third intermediate arm is rotated about a central section of the third intermediate arm.

12. The compensation system according to claim 11, wherein each of the intermediate arms are attached to a guide device extending parallel to the first axis, wherein each of the intermediate arms include a guide point at the respective central section of each of the intermediate arms, and wherein each of the intermediate arms is supported rotatable at the respective guide point and moveable parallel to the first direction.

13. A vehicle, comprising:
the compensation system of claim 1;
a fixed part fixed relative to a frame of the vehicle;
a movable part which can be adjusted to different positions relative to the frame of the vehicle;
the at least one supply line which includes an electric cable and/or a pneumatic line, the at least one supply line having a line end connected to the fixed part and a second line end connected to the movable part;
wherein the compensation system further comprises a first end section fixed to either the fixed part or the movable part and a second end section fixed to the other of the fixed part or the movable part; and
wherein the compensation system is configured to prevent slack of the at least one supply line when the distance between the fixed part and the movable part is reduced.

14. A compensation system for holding and guiding at least one supply line, comprising:
a first wheel arrangement that includes at least one first wheel rotatable about a first axis;
a second wheel arrangement that includes at least one second wheel rotatable about a second axis; and
a tensioning device configured to bias the wheel arrangements away from each other along a third axis, wherein the third axis extends substantially orthogonal to the first axis and to the second axis;
wherein each of an outer half of the at least one first wheel and an outer half of the at least one second wheel face away from the tensioning device;
wherein a section of the at least one supply line has a first line end which is configured to be held at a fixed part of a vehicle and a second line end which is configured to be held at a movable part of the vehicle;
wherein the section of the at least one supply line is slung around both outer halves and is pre-tensioned by the tensioning device; and
wherein the at least one first wheel and the at least one second wheel each have an outer rim configured to receive the at least one supply line.

15. The compensation system according to claim 14, wherein the at least one of the first wheel arrangement and the second wheel arrangement is guided by a wheel rail which extends substantially parallel to the third axis and is configured to be fixed relative to the fixed part.

16. The compensation system according to claim 14, wherein the at least one first wheel includes a plurality of first wheels each of which is rotatable about the first axis and the at least one second wheel includes a plurality of second wheels each of which is rotatable about the second axis, and wherein the at least one supply line is slung around the outer halves of the at least one first wheel and the at least one second wheel multiple times.

17. The compensation system according to claim 14, wherein the tensioning device includes at least one of a spring and an actuator.

18. A vehicle, comprising:
the compensation system of claim 14;
the fixed part that is fixed relative to a frame of the vehicle;
the movable part which can be adjusted to different positions with respect to the frame of the vehicle;
the at least one supply line which includes an electric cable and/or a pneumatic line, the at least one supply line having a line end connected to the fixed part and a second line end connected to the movable part;
wherein the compensation system further comprises a first end section fixed to either the fixed part or the movable part, and a second end section fixed to the other of the fixed part or the movable part; and
wherein the compensation system is configured to prevent slack of the at least one supply line when the distance between the fixed part and the movable part is reduced.

19. A compensation system for transmitting electric current between a fixed part of a vehicle and a movable part of a vehicle, comprising:
a support device fixedly mounted to the fixed part or the movable part of a vehicle;
wherein the support device comprises a support bar extending with constant cross section parallel to a first axis;
wherein a supply line has a first line end held at a first end section of the support device and that includes a helical section which winds around the support bar;
wherein the support line includes a second line end which remains moveable relative to the support bar; and
wherein a distance between the windings of the helical section increases when the second line end is moved away from the first line end.

20. The vehicle of claim 19, comprising:
the compensation system according to claim 19;
the fixed part fixed relative to a frame of the vehicle;
the movable part configured to be adjusted in different positions with respect to the frame of the vehicle;
the supply line which includes an electric cable and/or a pneumatic line, the supply line having a first line end connected to the fixed part and a second line end connected to the movable part;
wherein the compensation system comprises a first end section fixed to either the fixed part or the movable part, and a second end section fixed to the other of the fixed part or the movable part; and
wherein the compensation system is configured to prevent slack of the supply line when the distance between the fixed part and the movable part is reduced.

* * * * *